(12) United States Patent
Reisch

(10) Patent No.: US 8,212,483 B2
(45) Date of Patent: Jul. 3, 2012

(54) BRIGHTNESS CONTROLLED LIGHT SOURCE

(75) Inventor: Juergen Reisch, Fuerstenfeldbruck (DE)

(73) Assignee: Infineon Technologies Austria AG, Villach (AT)

( * ) Notice: Subject to any disclaimer, the term of this patent is extended or adjusted under 35 U.S.C. 154(b) by 283 days.

(21) Appl. No.: 12/138,299

(22) Filed: Jun. 12, 2008

(65) Prior Publication Data

US 2009/0309500 A1  Dec. 17, 2009

(51) Int. Cl.
*B60Q 1/02* (2006.01)
(52) U.S. Cl. .......................... 315/82; 315/149; 315/307
(58) Field of Classification Search .................. 315/77, 315/82, 149–158, 219, 224, 294, 307, 312
See application file for complete search history.

(56) References Cited

U.S. PATENT DOCUMENTS

| | | | | |
|---|---|---|---|---|
| 5,399,868 A * | 3/1995 | Jones et al. | ................ | 250/484.2 |
| 6,049,171 A * | 4/2000 | Stam et al. | ...................... | 315/82 |
| 6,403,942 B1 * | 6/2002 | Stam | ....................... | 250/214 AL |
| 6,877,879 B2 * | 4/2005 | Holz et al. | ..................... | 362/259 |
| 7,541,743 B2 * | 6/2009 | Salmeen et al. | ................ | 315/77 |
| 7,939,793 B2 * | 5/2011 | Rains et al. | .................... | 250/228 |
| 2002/0181240 A1 * | 12/2002 | Holz et al. | ..................... | 362/487 |
| 2004/0188593 A1 * | 9/2004 | Mullins et al. | ................ | 250/205 |
| 2005/0243556 A1 * | 11/2005 | Lynch | ........................... | 362/276 |
| 2005/0253533 A1 * | 11/2005 | Lys et al. | ...................... | 315/224 |
| 2007/0001822 A1 * | 1/2007 | Haug | ........................ | 340/384.1 |
| 2007/0132706 A1 * | 6/2007 | Nishimura et al. | ........... | 345/102 |
| 2008/0019123 A1 * | 1/2008 | Catalano et al. | .............. | 362/157 |
| 2008/0309255 A1 * | 12/2008 | Myers et al. | ................... | 315/297 |

FOREIGN PATENT DOCUMENTS

DE    195 08 184 A1    9/1996

* cited by examiner

*Primary Examiner* — Tung X Le

(74) *Attorney, Agent, or Firm* — Slater & Matsil, L.L.P.

(57) ABSTRACT

A method and system is provided for automatic brightness control of a light source. The system includes at least one light sensor that operates in a different range of the light spectrum than the light spectrum generated by the controlled light source.

30 Claims, 4 Drawing Sheets

BRIGHTNESS CONTROLLED LIGHT SOURCE

TECHNICAL FIELD

The present invention refers to a system and method for controlling or regulating brightness of light sources.

BACKGROUND

There exist systems for controlling the brightness of light sources dependent on the light intensity emitted from other light sources. Known systems comprise an external light dimmer for a manual regulation of the light source. Other known systems make use of additional "twilight switch electronics" that have to be shadowed from the radiation of the regulated light source. In such systems the light sensor is influenced by the regulated light source itself, if they are positioned together in the range of influence at the same place. For avoiding mutual influence of the light sensor and the regulated light source, high additional efforts of external electronic control and of additional wiring, and thus additional costs had been necessary.

In other known systems for regulating light sources for vehicles, the light emission of the light source is controlled independently from artificial light sources using filters to block the light emitted from the controlled light source to fall into a light sensible sensor. Due to the filter the known system is a complicated construction and is restricted to a discrete selection of the light passing through the used filter.

SUMMARY OF THE INVENTION

The present invention aims to reduce said backlashes and to provide a more simple system and method for a daylight controlled light source. Said goals can be achieved by means of the subject matters of the independent claims. Further embodiments of the present invention are defined by the dependent claims, respectively.

In a first aspect of the invention, a system for automatic brightness control of a light source is made available, in which a light sensor operates in a different range of the light spectrum than the light spectrum generated by the controlled light source.

Embodiments of the present invention provide an automatic brightness regulation of light sources as a function of the ambient daylight intensity, without exertion of influence by the self-generated radiation intensity.

According to an aspect of the present invention, the light sensor used is substantially not sensible for light emitted or radiated from the controlled light source but substantially sensible for natural light in the vicinity of the controlled light source. Thus, an influencing of the light sensor by the light source itself can be avoided.

Embodiments have advantages over known systems with a twilight switch, which cannot distinguish between light emitted from an artificial light source and light radiated from a natural light source. Furthermore, the use of a light sensor operating in a different range of the light spectrum than the light spectrum radiated from the controlled light source eliminates the necessity of a filter to block light emitted from artificial light sources and thus makes the system and method of the invention more simple compared to known control mechanisms.

According to another embodiment of the present invention a brightness sensor or light sensor is used for controlling a light source or bulb, wherein the brightness or light sensor operates in the ultraviolet (UV) range of the sunlight/daylight spectrum. Since the light source does not or only slightly radiate in the UV range of the light spectrum, the control system and method according to the present invention work independent from the light emission of the controlled light source.

According to an embodiment of the present invention, the brightness or light intensity of the controlled light source depends substantially on the ambient "daylight" incidence or on the sunlight proportion in the vicinity of the controlled light source.

In another embodiment of the present invention, the invisible ultraviolet (UV) proportion of the sunlight spectrum is evaluated and utilized by the light sensible sensor to regulate the brightness of the controlled light source. In a particular embodiment, the light spectrum in the range of about 200 nm to 500 nm wavelengths is detected by the light sensor and utilized by the brightness control system to regulate the brightness of the controlled light source. However, the range of the light spectrum used and detected by the light sensible sensor and utilized by the brightness control system to regulate the brightness of the controlled light source may be adapted and dependent of the specific application of the automatic brightness control system.

In still another embodiment of the present invention, the UV proportion of the light spectrum is detected via an opto-electronic sensor. Alternatively or in addition, the amplitude of the UV proportion of the light spectrum is detected via an opto-electronic sensor. The opto-electronic sensor may regulate the brightness of the controlled light source on a linearly or logarithmically programmable basis.

According to another embodiment of the present invention, the UV proportion of the light spectrum is detected by an active light sensor comprising active electronic elements, e.g., a number of transistors that amplify the current generated in the light sensor. In yet another embodiment of the present invention, the UV proportion of the light spectrum is detected by an electronic wavelength filter that electronically selects the UV proportion out of the light spectrum.

According to another embodiment of the present invention, the brightness, the light power or intensity of the controlled light source is automatically regulated. The regulation of the light intensity of the controlled light source may be within a range from "Zero" to "maximum", i.e., from the switched off status of the controlled light source to the maximum light power of the controlled light source.

According to another embodiment of the present invention, the regulation may be programmable as a function of the oppositely proportional ambient brightness in the vicinity of the controlled light source. According to embodiments of the system and method of the present invention, the radiated brightness of the controlled light source is independent of the self-generated ambient brightness or room brightness and independent of the brightness generated by other artificial light sources.

According to another embodiment, electronic components of the control system may be implemented on an integrated circuit. In an embodiment all electronic components of the system according to the present invention may be implemented monolithically on a single semiconductor chip. The integrated circuit or chip carrying components of the system according to the present invention may be integrated in the controlled light source itself. For instance, the integrated circuit or chip may be integrated in the socket, in the casing or in the bulb of the controlled light source.

The integrated circuit or chip may contain one or more electronic elements of the system according to the present invention, such as a light sensor (photo sensor) sensible for UV sunlight/daylight, an AC/DC-rectifier or transformer for providing a current supply for the light sensor, a control logic for regulating the brightness of the controlled light source, a voltage converter or a high voltage switch, e.g., an Insulated Gate Bipolar Transistor (IGBT), TRIode Alternating Current switch (TRIAC), a High Voltage CMOS (HVCMOS), a Cool-MOS, etc., as a current supplier of the light source.

According to another embodiment of the present invention, the current supply for the integrated circuit or chip is provided by an interface parallel or coupled to the socket connection of the controlled light source. Therefore, a voltage converter may be provided to transform an external current supply to the voltage used for components of the control system. For instance, the voltage converter or transformer may be capable to convert and/or transform alternating current operating voltage with 100 V-240 V to direct current with 3-20 V, depending on the external current supply voltage and the voltage needed for components of the control system according to the present invention.

When the controlled light source requires alternating current, the opto-electronical UV sampling of the light sensor may be performed during the voltage zero-crossing of the current supply to the controlled light source. If the present invention is implemented on an integrated circuit in CoolMos technology, power-saving modes or a low standby current modes may be provided. In addition, an Insulated Gate Bipolar Transistor (IGBT) element for controlling or regulating the current may be used in a proportionate manner to the light power to be emitted from the controlled light source. Alternatively, any other high voltage switch, e.g., a TRIode Alternating Current switch (TRIAC), a High Voltage CMOS (HVCMOS), a CoolMOS, etc., may be used.

Embodiments of the present invention may be used in the manner of an automatic brightness regulation of bulbs, energy saving lamps, and other kinds of light sources as a function of ambient daylight intensity. The components of the system may be implemented by integrated electronic elements on an integrated circuit, which may be placed in the glass bulb or in standard sockets of the light source. Alternatively, the system may be adapted to control brightness of light emitting diodes (LEDs), saving fluorescent lamps, or quartz lamps as a function of ambient daylight intensity.

Embodiments of the present invention may be used for power saving purposes at the illumination of buildings, rooms, streets, car headlights, low-energy light bulbs etc. The present invention may be implemented in all kinds of bulbs in exchangeable standard sockets (e.g., E14/E27) for easy exchangeability and cost reduction. Embodiments of the present invention may be implemented in dimmable energy saving lamps as far as they allow regulation of their brightness. In case the light source to be controlled does not allow integration of an integrated circuit carrying components, the integrated circuit may be arranged in the vicinity of the respective light source.

Various embodiments may help to reduce power consumption of illuminations and thus result in cost savings. The system and method of the present invention may be used in an environmentally friendly manner, since ambient light controlled light sources only generate the required brightness as a function of the ambient light.

In case the system is integrated in the light source itself, a conventional bulb may easily be replaced by an "automatic bulb" with a system according to one of the embodiments described herein, as the socket of the bulb remains the same.

A bulb with an integrated system may not require external elements such as an external twilight switches, light dimmers or wirings, etc.

In case of strongly mirrored bulbs that prevent the entering of daylight the light sensible sensor may be arranged outside the bulb such that the light in the vicinity of the controlled light source falls onto the light sensible sensor. In case the controlled light source generates extraordinary high temperatures, and the operation of an integrated circuit carrying components of the system according to the present invention may be affected, the components may be provided in a high temperature technology.

The light sensor should be installed with an orientation to the ambient light so that the intensity of the light in the vicinity of the controlled light source is substantially the basis for the regulation of the brightness of the controlled light source.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended benefits of the present invention will be readily appreciated, as they become better understood by reference to the following detailed description. The elements of the drawings are not necessarily to scale relative to each other. Like reference numerals designate corresponding or similar parts.

The following reference numbers can be used in conjunction with the drawings:
   1 controlled light source
   2 glass bulb of the light source 1
   3 socket of the light source 1
   4 spiral-wound filament of the light source 1
   5 external wirings
   6 brightness control system
   7 UV photo sensor or light sensor
   8 control logic
   9 high voltage switch, IGBT, TRIAC, HVCMOS, Cool-MOS, etc.
   10 AC/DC voltage converter
   11 power supply
   12 internal wirings
   A Arrows indicating daylight radiation

DETAILED DESCRIPTION OF ILLUSTRATIVE EMBODIMENTS

In the following detailed description, reference is made to the accompanying drawings, which form a part hereof, and in which is shown by way of illustration specific embodiments in which the invention may be practiced. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The drawings illustrate embodiments of the present invention for an automatic brightness regulation of light sources, wherein the regulation is independent from the radiation intensity of the controlled light source itself. The automatic brightness regulation of the controlled light source can be a function of the ambient daylight intensity, without exertion of influence by the self-generated radiation intensity of the controlled light source.

Figure 1:
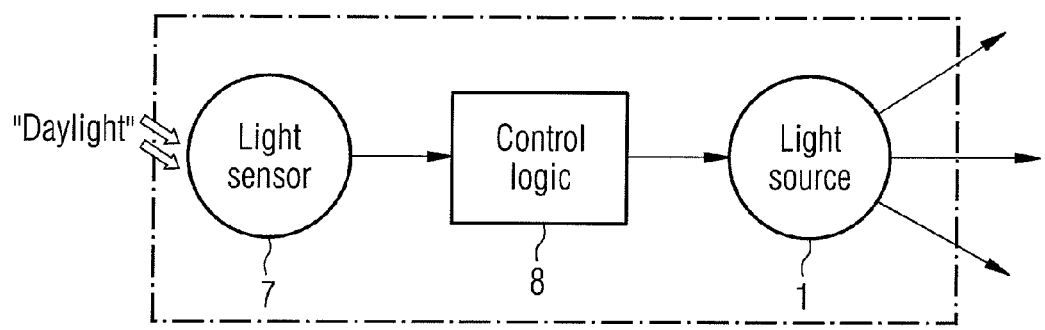
FIG. 1 shows a scheme illustrating a functional principal of a system for automatic brightness control of a light source according to an embodiment of the present invention.

In FIG. 1, a scheme illustrating the functional principal of a system for automatic brightness control of a light source according to an embodiment of the present invention is shown. According to this simple schematic overview the functional principal involves a light sensor 7 sensing the daylight portion in the ambient light in the vicinity of one or more light sources 1, which is controlled by an automatic brightness regulation system. The light sensor 7 provides a signal to a control logic 8, the signal indicates the sensed intensity of the daylight proportion of the light surrounding the controlled source 1.

Based on the signal provided from the daylight sensor 7, the control logic 8 calculates a control signal or the control logic 8 determines the respective power supply voltage needed to generate the required light intensity or brightness to be produced by the light source 1. The control logic 8 provides a respective control signal or the respective power supply voltage to the light source 1. The light source 1 generates the required brightness in response to the signal provided from the control logic 8 or in response to supplied voltage power. Thus, the brightness of the light source 1 is regulated or controlled by the daylight in the vicinity without being affected by other (artificial) light or light sources.

Figure 2:
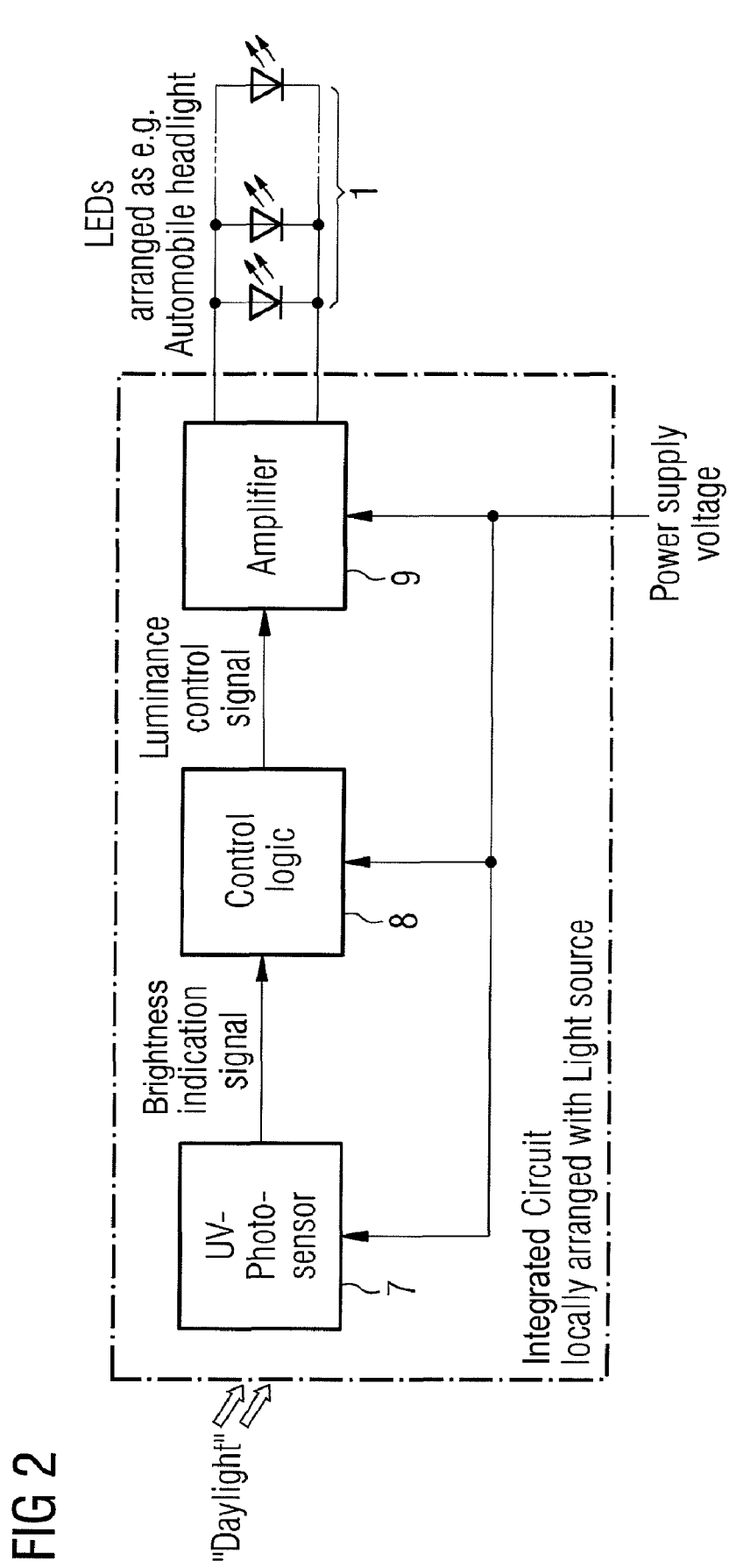
FIG. 2 shows a scheme illustrating a functional principal of a system for automatic brightness control of a number of light sources according to an embodiment of the present invention.

In FIG. 2 a scheme illustrating the functional principal of a system according to an embodiment of the present invention for an automatic brightness control of a number of light sources is shown. The schematic view shown in FIG. 2 has common features with the schematic view shown in FIG. 1 as the system according to this embodiment of the present invention involves a light sensor or UV photo sensor 7 which is substantially only sensitive for the daylight proportion of the ambient light in the vicinity of one or more light sources 1 that are controlled by a brightness regulation system. The light sensor 7 provides a brightness indication signal to a control logic 8 indicating the sensed intensity of the daylight surrounding the controlled sources 1.

On the basis of the signal provided from the daylight sensor 7, the control logic 8 calculates a control signal or the control logic 8 determines the respective power supply voltage needed to generate the desired light intensity or brightness to be produced by the controlled light sources 1. The control logic 8 provides a respective luminance control signal to an amplifier 9, which generates the required power supply voltage on the basis of the luminance control signal. The amplifier 9 provides the respective power supply voltage to the light sources 1 and the light sources 1 generate brightness according to the supplied voltage power.

The UV photo sensor 7, the control logic 8 and the amplifier 9 are each provided with power supply voltage, e.g., 3-20 V direct current. Furthermore, the UV photo sensor 7, the control logic 8 and the amplifier 9 may be implemented in an integrated circuit as indicated by the dashed line in FIG. 2. The integrated circuit may be locally arranged close to the controlled light source 1. In an embodiment of the present invention, the integrated circuit with the UV photo sensor 7, the control logic and the amplifier 9 may be integrated within the controlled light source 1.

In the embodiment shown in FIG. 2 the controlled light sources 1 are light emitting diodes (LEDs), which can be, for example, arranged in an automobile headlight. The light sources or light emitting diodes 1 generate the required brightness in response to the signal provided from the control logic 8 or in response to voltage power supplied from the amplifier 9. Thus, the brightness of the light sources 1 is regulated or controlled by the daylight in the vicinity of the controlled light sources 1 without being influenced by other (artificial) light or light sources.

In this implementation of controlled light sources or light emitting diodes 1 arranged in an automobile headlights the present invention may contribute to reduce carbon dioxide emission of automobiles, since the light sources of the headlights can be controlled or regulated by means of a system or method so that the light sources 1 only generate the required brightness dependent from the ambient daylight. Thus, embodiments of the present invention might lead to power reduction in illumination arrangements in general and in particular to fuel savings in automobiles.

Figure 3:
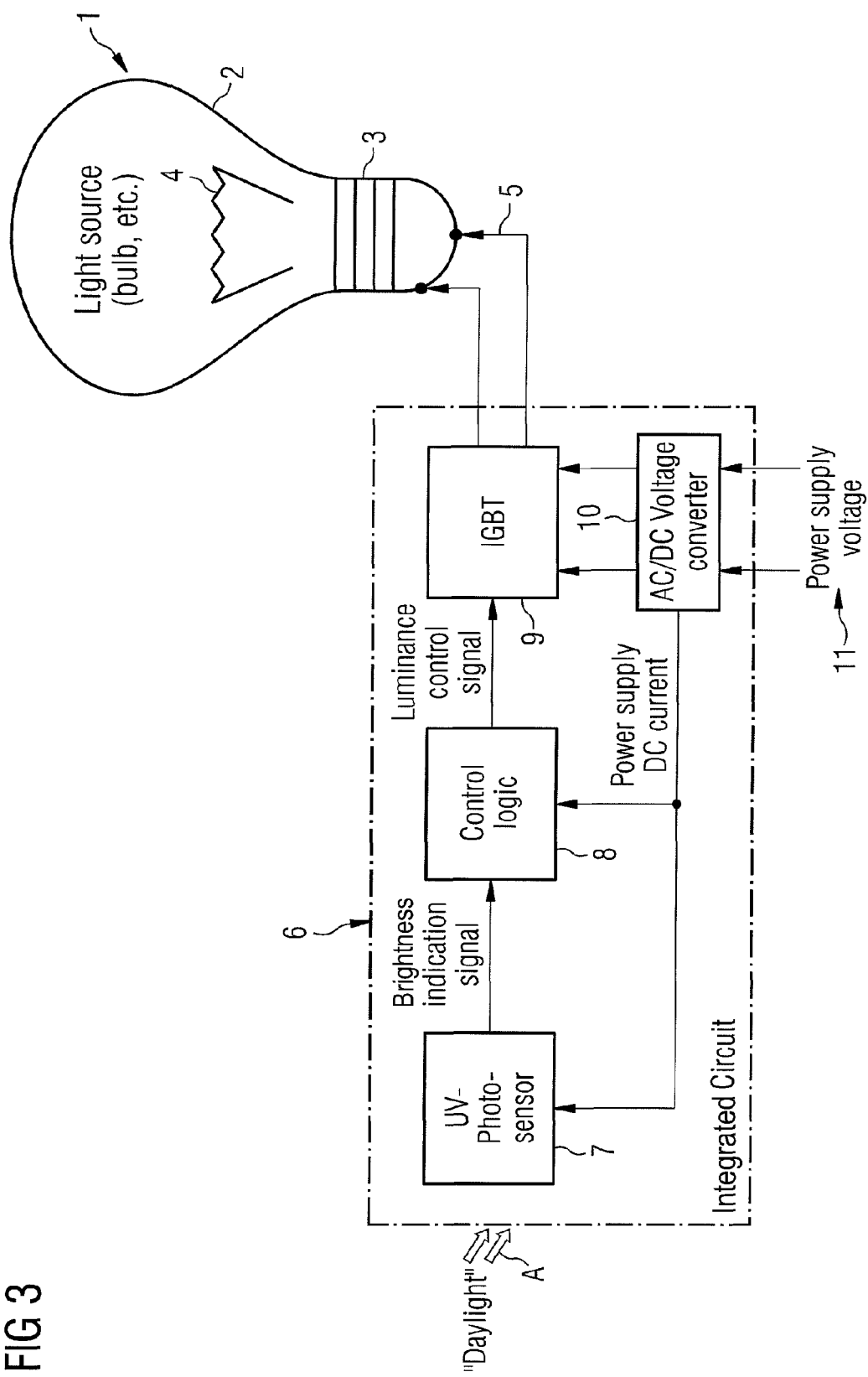
FIG. 3 shows a schematic view of a system for automatic brightness control of a light source according to an embodiment of the present invention implemented with an integrated circuit arranged locally together with the controlled light source.

In FIG. 3 a schematic view of a system for automatic brightness control of a light source according to an embodiment of the present invention is shown, wherein components of the brightness control system are implemented on an integrated circuit 6. The controlled light source 1 may be a standard light bulb with a socket 3 comprising a standard winding and with a glass bulb 2 encompassing a spiral-wound filament 4. Alternatively, the brightness control system 6 according to the present invention may be coupled and adapted to control brightness of light emitting diodes (LEDs), fluorescent lamps, low-energy light bulbs or quartz lamps etc.

In the embodiment shown in FIG. 3 components of the brightness control system 6 are implemented on an integrated circuit, which is arranged locally together. The brightness control system 6 can be arranged in the vicinity of the controlled light source 1 but outside of the controlled light source 1. The controlled light source 1 and the brightness control system 6 are connected via external wirings 5 coupled to electric connection points at the socket 3 of the light source 1.

In this embodiment, the brightness control system 6 comprises a light sensor 7, which is operating in or sensible for the invisible or ultraviolet (UV) range of the sunlight/daylight spectrum. As the controlled light source 1 does not or only slightly radiate in the UV range of the light spectrum, an influence of the light sensor or UV photo sensor 7 by the light source 1 is reduced or excluded.

The light sensor or UV photo sensor 7 detects the intensity or brightness of the incident light or daylight falling onto the light sensible surface of the light sensor 7. The rays of incident light or daylight falling onto the light sensible surface of the light sensor 7 are indicated in FIG. 3 by arrows A. Since the light sensor 7 is arranged locally together with the controlled light source 1, the light sensor or UV photo sensor 7 detects the intensity of the light or brightness in the vicinity of the controlled light source 1.

On the basis of the light intensity or brightness detected by the light sensor 7 in the vicinity of the controlled light source 1, the brightness control system 6 regulates or controls the brightness of the controlled light source 1 in the following manner. The light sensor 7 generates a brightness indication signal dependent on the light intensity or brightness of incident light or daylight A falling onto the light sensible surface of the light sensor 7.

The light sensor 7 provides the brightness indication signal to a control logic 8, which calculates the necessary brightness of the controlled light source 1 on the basis of the brightness indication signal transmitted from the light sensor 7. Thus, the control logic 8 calculates the necessary brightness of the controlled light source 1 as a function or dependent on the ambient daylight or brightness in the vicinity of the controlled light source 1 and generates a respective luminance control signal.

The control logic 8 provides the luminance control signal to a high voltage switch 9, e.g., an Insulated Gate Bipolar Transistor (IGBT), a TRIode Alternating Current switch (TRIAC), a High Voltage CMOS (HVCMOS), a CoolMOS, etc., which generates a respective voltage dependent on the luminance control signal transmitted from the control logic 8. The voltage generated by the IGBT 9 is provided to the controlled light source 1, which in turn produces light with a luminance or brightness according to the luminance control signal transmitted from the control logic 8. Alternatively, any other high voltage switch may be used.

Since the controlled light source 1 does not or only slightly radiates in the UV range of the light spectrum, the brightness control system 6 according to the present invention may function independent from the light emission of the controlled light source 1. The brightness or light intensity of the controlled light source 1 depends substantially on the ambient daylight incidence or on the sunlight proportion detected by the light sensor or UV photo sensor 7 in the vicinity of the controlled light source 1.

An AC/DC voltage converter 10 is provided, e.g., to convert or transform current supply voltage from 100-240 V of alternating current to 3-20 V of direct current, depending on the external power supply voltage 11 and the current supply voltage needed for the components 7, 8 and 9 of the brightness control system 6 according to the present invention. The AC/DC voltage converter 10 is coupled to each component 7, 8, 9 of the control system 6 to provide power supply, e.g., DC current.

The light sensor or UV photo sensor 7 of the control system 6 is connected via suitable signal paths or wires to the control logic 8 to transmit the above mentioned brightness indication signal. Furthermore, the control logic 8 of the control system 6 is connected via suitable signal paths or wires to the high voltage switch IGBT 9 to transmit the above mentioned luminance control signal brightness indication signal. The high voltage switch IGBT 9 is connected via external wirings 5 to the controlled light source 1 coupled at electric connection points on the socket 3 of the controlled light source 1 to provide voltage generated by the high voltage switch IGBT 9 to the controlled light source 1.

Figure 4:
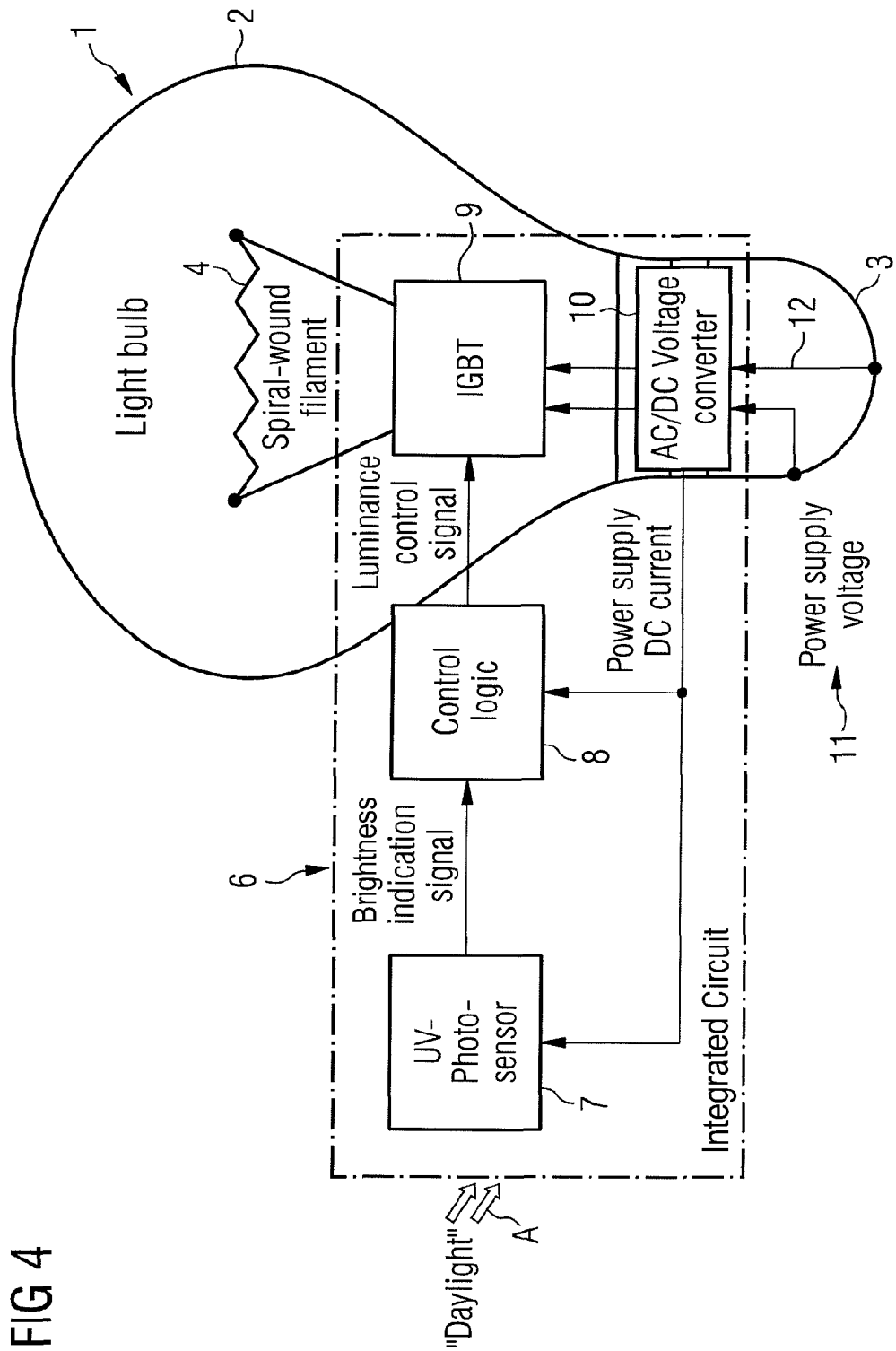
FIG. 4 shows a schematic view of a system for automatic brightness control of a light source according to another embodiment of the present invention implemented with an integrated circuit arranged within the controlled light source.

In FIG. 4 a schematic view of a system for automatic brightness control of a light source according to another embodiment of the present invention is shown, wherein components of the brightness control system are implemented on an integrated circuit. The embodiment shown in FIG. 4 has features in common with the embodiment shown in FIG. 2. Different to the embodiment shown in FIG. 3, in the embodiment shown in FIG. 4 the integrated circuit with components of the brightness control system 6 is arranged within the controlled light source 1.

For the sake of visibility some components 7, 8 of the brightness control system 6 are illustrated outside of the controlled light source in FIG. 4. However, the embodiment shown in FIG. 4 shall be understood in a manner that all components 7, 8, 9 of the brightness control system 6 are implemented on an integrated circuit which is completely integrated or included in the controlled light source 1. For instance, the integrated circuit carrying the components 7, 8, 9 of the brightness control system 6 may be integrated or included in the glass bulb 2, in the housing and/or in the socket 3 of the controlled light source 1.

Like the embodiment shown in FIG. 3, the embodiment shown in FIG. 4 comprises a brightness control system 6 with a light sensor 7, which is sensible for the UV range of the sunlight/daylight spectrum. The light sensor or UV photo sensor 7 detects the intensity or brightness of the incident light or daylight falling onto the light sensible surface of the light sensor 7 as indicated by arrows A. Since the light sensor 7 is arranged close to the controlled light source 1, the light sensor or UV photo sensor 7 detects the intensity of the light or brightness in the vicinity of the controlled light source 1.

The light sensor 7 generates a brightness indication signal dependent on the light intensity or brightness of incident light or daylight A. The brightness indication signal is transmitted to a control logic 8, which calculates the necessary brightness of the controlled light source 1 on the basis of the brightness indication signal, i.e., as a function of the ambient daylight intensity or brightness in the vicinity of the controlled light source 1 and generates a respective luminance control signal.

The luminance control signal is transmitted to a high voltage switch, e.g., an Insulated Gate Bipolar Transistor (IGBT) 9, which generates a respective voltage dependent on the luminance control signal. The voltage generated by the high voltage switch IGBT 9 is provided to the controlled light source 1, which in turn produces light with a luminance or brightness according to the supply voltage provided by the high voltage switch IGBT 9.

An AC/DC voltage converter 10 converts or transforms current supply voltage from alternating current with 100-240 V to direct current with 3-20 V, depending on the external power supply voltage 11 and the current supply voltage needed for the components 7, 8 and 9 of the brightness control system 6. The AC/DC voltage converter 10 is coupled to each component 7, 8, 9 of the control system 6 to provide respective power supply.

The light sensor or UV photo sensor 7 of the control system 6 is coupled via suitable signal paths or wires to the control logic 8 to transmit the above mentioned brightness indication signal. The control logic 8 of the control system 6 is coupled via suitable signal paths or wires to the high voltage switch IGBT 9 to transmit the above mentioned luminance control signal brightness indication signal. The high voltage switch IGBT 9 may be coupled to the spiral-wound filament 4 of the controlled light source 1 to provide voltage generated by the high voltage switch IGBT 9 to the controlled light source 1.

As already mentioned, the high voltage switch IGBT 9 is also coupled to the control logic 8 which provides a luminance control signal to the high voltage switch IGBT 9 based on the brightness indication signal, provided by the UV-Photosensor 7 in accordance with the ambient daylight intensity or brightness sensed in the vicinity of the controlled light source 1. As shown in FIG. 4, the high voltage switch IGBT 9 may be integrated or included in the glass bulb 2, in the housing or in the socket 3 of the controlled light source 1.

According to the illustrated implementations of the present invention the light source is controlled by a brightness or light sensor operating in the proportionate ultraviolet range of the sunlight/daylight spectrum. As the controlled light source does not or only slightly radiate in the UV range of the light spectrum, an influencing of the light sensor by the light source is at least reduced or excluded.

In the embodiment of the present invention shown in FIG. 4, the light sensor 7 used for automatic brightness regulation of the light source 1 and the controlled light source 1 are integrated in a common device. Therefore, the light sensor 7 is integrated in the socket 3 or in the glass bulb 2 of controlled light source 1. Furthermore, the integrated circuit with the components 7, 8, 9 of the brightness control system 6 may be integrated or included in the glass bulb 2, in the housing or in the socket 3 of the controlled light source 1. Thus, the complete brightness control system 6 may be integrated or included in the glass bulb 2, in the housing or in the socket 3 of the controlled light source 1.

In the embodiments of the present invention for determining the brightness of the controlled light source shown in the drawings, the daylight sensor 7 uses the UV wavelength spectrum of the sunlight which is in turn not or only slightly radiated by most light sources. Thus, the light source 1 controlled by the brightness control system 6 may emit only as much brightness as is demanded by the ambient daylight. Hence, the present invention may provide cost and current savings and thus high environmental friendliness.

While described herein with respect to daylight, the sensor 7 could be used to control brightness based on other portions of the spectrum. For example, an application may require white light from a light source that generates light with a known deficiency at a specific wavelength(s). A supplemental light source could provide light at that wavelength as a function of the brightness of light generated at a stronger wavelength of the first source. In this manner, the brightness of the dual light source system can be controlled by actively controlling only the first source.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the relevant art that this invention can also be employed in a variety of other applications.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A light control system comprising:
a vehicle headlight configured to emit light in a visible range of a light spectrum;
a light sensor configured to operate in an ultraviolet range of the light spectrum, wherein the ultraviolet range of the light spectrum is different than the visible range of the light spectrum, and wherein the light sensor is substantially insensitive to the visible range of the light spectrum; and
a control logic coupled to the light sensor and the vehicle headlight, the light sensor configured to provide information to the control logic to control a brightness of the vehicle headlight.

2. The system according to claim 1, wherein the light sensor is configured to provide information to control the brightness of the vehicle headlight as a function of daylight intensity sensed by the light sensor.

3. The system according to claim 1, wherein the light sensor is configured to operate in the ultraviolet range of the light spectrum such that the controlled brightness of the vehicle headlight depends substantially on daylight incidence or on sunlight in a vicinity of the vehicle headlight.

4. The system according to claim 1, wherein the light sensor is configured to cause light intensity of the vehicle headlight to be regulated within a range from 0 to maximum and/or from a switched off status of the controlled vehicle headlight to a maximum light emission of the vehicle headlight.

5. The system according to claim 1, wherein the light sensor comprises an opto-electronic sensor.

6. The system according to claim 1, wherein the light sensor is configured to detect an ultraviolet portion of the light spectrum, the light sensor comprising active electronic elements that amplify a current generated in the light sensor.

7. The system according to claim 6, wherein the light sensor comprises an electronic wavelength filter that electronically selects the ultraviolet portion of the light spectrum.

8. The system according to claim 1, wherein the light control system comprises a programmable brightness control system.

9. The system according to claim 8, wherein the programmable brightness control system is programmable to regulate the brightness of the vehicle headlight as a function of ambient brightness of light in the ultraviolet range in the a vicinity of the controlled vehicle headlight.

10. The system according to claim 1, wherein the light sensor and the control logic are implemented in a single integrated circuit.

11. The system according to claim 10, wherein the integrated circuit includes functionality implemented in CoolMos technology.

12. The system according to claim 10, wherein the integrated circuit is integrated in the vehicle headlight, in a socket of the vehicle headlight, in a casing of the vehicle headlight and/or in a glass bulb of the vehicle headlight.

13. The system according to claim 1, further comprising an AC/DC rectifier or transformer and/or a voltage converter coupled between the light sensor and the vehicle headlight.

14. The system according to claim 1, further comprising an insulated gate bipolar transistor element for controlling or regulating current in a proportionate manner to the a light power to be emitted from the vehicle headlight, the insulated gate bipolar transistor element being coupled between the light sensor and the vehicle headlight.

15. The system according to claim 1, wherein a current supply for the light control system is provided by an interface parallel or coupled to a socket connection of the vehicle headlight.

16. The system according to claim 1, wherein the light control system is capable of implementing a power-saving mode and/or a low standby current mode.

17. The system according to claim 1, wherein the light sensor is arranged with an orientation to ambient light such that the light sensor is configured to substantially detect brightness of natural light in a vicinity of the vehicle headlight as a basis for regulating the brightness of the controlled vehicle headlight.

18. The system according to claim 1, wherein the vehicle headlight comprises a bulb, a light emitting diode, a fluorescent lamp, a quartz lamp, a low-energy light bulb or a dimmable energy saving lamp.

19. The system according to claim 1, wherein the vehicle headlight comprises a plurality of light sources.

20. A method for controlling a light source, the method comprising:
    detecting brightness or intensity of daylight near a vehicle headlight by at least one light sensor that operates only in an ultraviolet range of light spectrum; and
    regulating brightness of a visible range of the light spectrum of the vehicle headlight based on the brightness or intensity of the daylight detected near the vehicle headlight.

21. The method according to claim 20, wherein the at least one light sensor is substantially insensitive to light generated by the vehicle headlight.

22. The method according to claim 20, wherein the ultraviolet range of the light spectrum is detected by the at least one light sensor and utilized to regulate the brightness of the vehicle headlight.

23. The method according to claim 20, wherein regulating the brightness of the vehicle headlight comprises varying light intensity of the vehicle headlight within a range from 0 to maximum and/or from a switched off status of the vehicle headlight to a maximum light emission power of the vehicle headlight.

24. The method according to claim 20, wherein the brightness of the vehicle headlight is regulated substantially independent of self-generated ambient brightness and/or room brightness and independent of light generated by artificial light sources.

25. The method according to claim 20, wherein the light sensor operates in a range of 200 nm to 500 nm wavelength.

26. The method according to claim 20, wherein the brightness of the vehicle headlight is regulated on a linearly and/or on a logarithmically basis.

27. The method according to claim 20, wherein, the vehicle headlight requires alternating current and wherein opto-electronical sampling of the light sensor being performed during a voltage zero-crossing of a current supply to the vehicle headlight.

28. An integrated circuit comprising components of a control and/or regulatory system, the integrated circuit being arranged and adapted such that it can be used as a control and/or regulatory device for performing the method according to claim 20.

29. A light control system comprising:
    a vehicle headlight configured to emit light in a visible range of a light spectrum and further configured not to emit light in an ultraviolet range of the light spectrum;
    a light sensor configured to operate in the ultraviolet range of the light spectrum and further configured to not operate in the visible range of the light spectrum; and
    a control logic coupled to the light sensor and the vehicle headlight, the light sensor configured to provide information to the control logic to control a brightness of the vehicle headlight.

30. The light control system according to claim 29, wherein the light sensor provides information to control the brightness of the vehicle headlight as a function of daylight intensity sensed by the light sensor.

* * * * *